Feb. 14, 1967

T. E. MYERS 3,304,498

VOLTAGE, POLARITY AND FREQUENCY TESTER HAVING
A.C.-D.C. COMPENSATION AND GAS
TUBE INDICATORS

Filed May 15, 1963.

INVENTOR.
Thomas E. Myers,
BY Parker & Carter
Attorneys.

United States Patent Office 3,304,498
Patented Feb. 14, 1967

3,304,498
VOLTAGE, POLARITY AND FREQUENCY TESTER HAVING A.C.-D.C. COMPENSATION AND GAS TUBE INDICATORS
Thomas E. Myers, St. Charles, Ill., assignor to Ideal Industries, Inc., Sycamore, Ill., a corporation of Delaware
Filed May 15, 1963, Ser. No. 280,637
4 Claims. (Cl. 324—133)

This invention relate to a voltage testing circuit arranged to give an indication of voltage amplitude, polarity and frequency.

A primary purpose is a voltage tester of the type described having improved means for indicating frequency of the voltage being tested.

Another purpose is a compact, simple and efficient voltage tester of the type described which can provide a visual indication of the amplitude, polarity and frequency of the voltage being tested.

Another purpose is a voltage tester using a low frequency filter and a high frequency filter for providing frequency indication.

Another purpose is a voltage tester of the type described having multiple high frequency filters to provide sharp cutoff.

Other purposes will appear in the ensuing specification, drawings and claims.

The invention is illustrated diagrammatically in the following drawings wherein:

FIGURES 1 and 2 are identical except for the high frequency filters. The circuit of FIGURE 1 will be described first.

Figure 1:
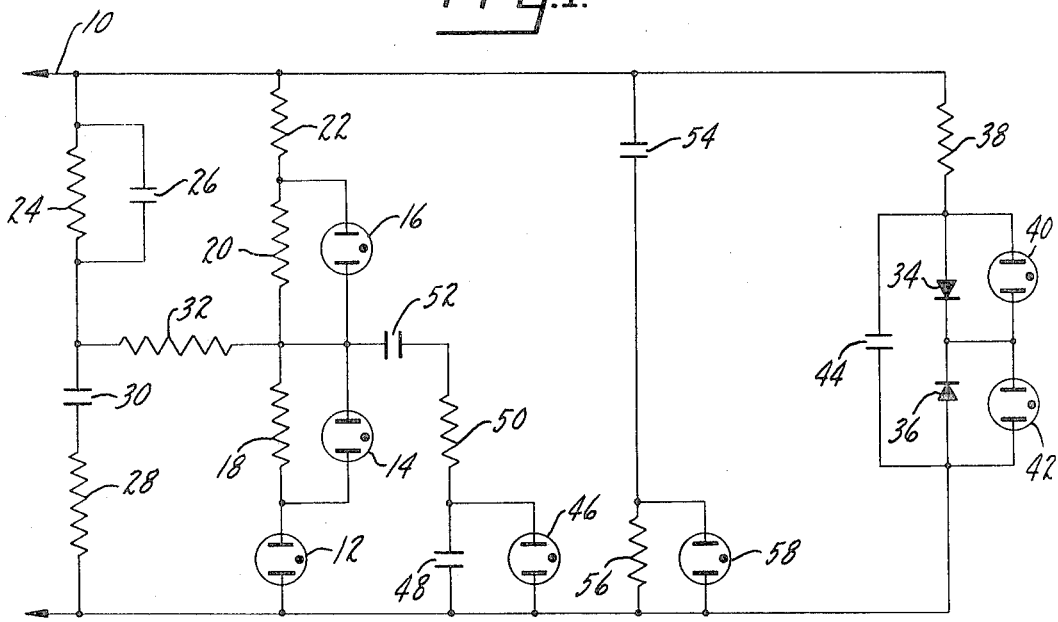
FIGURE 1 is a circuit diagram illustrating one form of voltage tester.

The input to the voltage tester circuit is indicated at 10. As is normal in a voltage testing circuit, the input may be in the form of probes attached at the ends of flexible wires so that the voltage in sockets or other receptacles, as well as the voltage at various points in a circuit, may be easily tested. Across the input 10 are three neon bulbs or gas indicating tubes 12, 14 and 16. The indicating tubes may be of any suitable type. As shown herein, the bottom bulb 12 will fire to indicate an input voltage of approximately 110 volts, bulb 14 will fire to indicate an input voltage of approximately 220 volts, and bulb 16 will fire to indicate an input voltage of approximately 440 volts. Because the bulbs are arranged somewhat in series, each bulb will fire at its own rated voltages, as well as higher voltages. For example, when the input voltage is roughly 440 volts, all of the bulbs will be lit.

The above three voltages are those most commonly tested in commercial and military applications. The invention should not be so limited and the circuit can be arranged to test any voltage in this general range.

Bulb 14 is in parallel with a resistor 18 and bulb 16 is in parallel with a resistor 20. The circuit is arranged so that there is no current flowing through any of the bulbs until bulb 12 fires. After bulb 12 has fired and current is flowing through the circuit, bulbs 14 and 16 will fire as soon as their required firing voltages are developed across resistors 18 and 20. A resistor 22 may be positioned in the circuit generally in series with the resistors 18 and 20 and with the bulb 12.

Neon bulbs of the type which may be used herein fire at peak voltages. As the rated values of the three voltages being tested are the R.M.S. voltages and not the peak voltages, some form of compensating network is necessary so that the bulbs will fire at the same voltage, whether it be A.C. or D.C. The particular compensating network shown is designed to reduce the peak A.C. voltage at the input by the square root of 2, or to bring it down to its R.M.S. value. This compensating network may take various forms and as shown herein, includes a resistor 24 in parallel with a capacitor 26, this combination being in series across the input with a resistor 28 and a capacitor 30. A resistor 32 may be bridged above the capacitor 30 to a point above bulb 14.

When a D.C. voltage is applied, all the input voltage will be across capacitor 30 and across tube 12. However, when an A.C. voltage is applied, the circuit behavior is different and the voltage applied to the bulbs will be reduced by the square root of 2, compared to the voltage that is applied to the bulbs when a D.C. voltage is at the input.

In addition to indicating voltage amplitude at the particular point tested, it is desirable to know the polarity of this voltage, if it is a D.C. voltage. That portion of the circuit at the right in the drawings is used for indicating voltage polarity. Suitable diodes 34 and 36 may be connected in series with a resistor 38, with an opposite terminal of each diode connected together. As shown, the cathodes are connected together. Neon bulbs of the type described are used for polarity indication and a bulb 40 is in parallel with diode 34 and a bulb 42 is in parallel with diode 36. A capacitor 44 may bridge both diodes to bypass A.C. currents.

Assuming that the top terminal is negative and the bottom is positive, there will be current flow through diode 36 and bulb 40. The voltage developed across the top diode or diode 34 is sufficient to ignite bulb 40 and indicate that the top terminal is negative. When the bottom terminal is negative, the current flow is the reverse and bulb 42 will be ignited.

It is desirable in any voltage tester to include means for indicating frequency. Particularly in military applications it is desirable to know whether or not the voltage has a frequency of 400 cycles or 60 cycles. The invention should not be limited to any particular frequencies as what is important is that there be a low frequency indicator and a high frequency indicator.

A 60-cycle or low frequency indicator may include an indicating bulb 46 connected in parallel with a capacitor 48. The top of the bulb may be connected through a resistor 50 and a capacitor 52 to a point above bulb 14, and the bottom of bulb 46 may be connected to the input.

In operation, the voltage at the top of bulb 14 will be clamped when bulbs 12 and 14 have fired. In this way the voltage applied to bulb 46 will be regulated, even though the input voltage may vary. For example, the input voltage may range anywhere from 104 to 484 volts, but the regulated voltage at the top of bulb 14 will go no higher than 220 volts. Without voltage regulation, the 60-cycle indicator bulb may fire at 400-cycle voltages above 300 volts. The capacitor 52 may be about 50 times the size of capacitor 48 and acts as a blocking capacitor on D.C. inputs. The impedance of capacitor 48 at 60 cycles is roughly six times its its impedance at 400 cycles. Bulb 46 will be arranged to fire at a voltage consistent with the voltage across capacitor 48 at 60 cycles, but not at 400 cycles. The impedance of the capacitor at 400 cycles will not provide sufficient voltage to fire bulb 46. This circuit may be designated a low pass filter network in that any frequency above the test frequency will not provide sufficient impedance to fire the indicating bulb 46. The cutoff for the filter network does not have to be particularly sharp as long as the frequencies being tested are sufficiently far apart. Some control over the firing potential of tube 46, when tube 14 has not fired, is provided by resistor 24 which is in series with bulb 46 across the input.

In order to give an indication of when the voltage at the input is at 400 cycles, or some other suitable high frequency, in FIGURE 1 a high pass filter is shown to include a capacitor 54 in series with a resistor 56 with a high frequency indicating bulb 58 being in parallel or across the resistor 56. The size of the condenser 54 is chosen so that sufficient voltage will be developed across resistor 56 only at frequencies above 400 cycles. At lower frequencies, most of the input voltage will be across the capacitor and there will not be sufficient voltage across resistor 56 to fire the tube.

Figure 2:
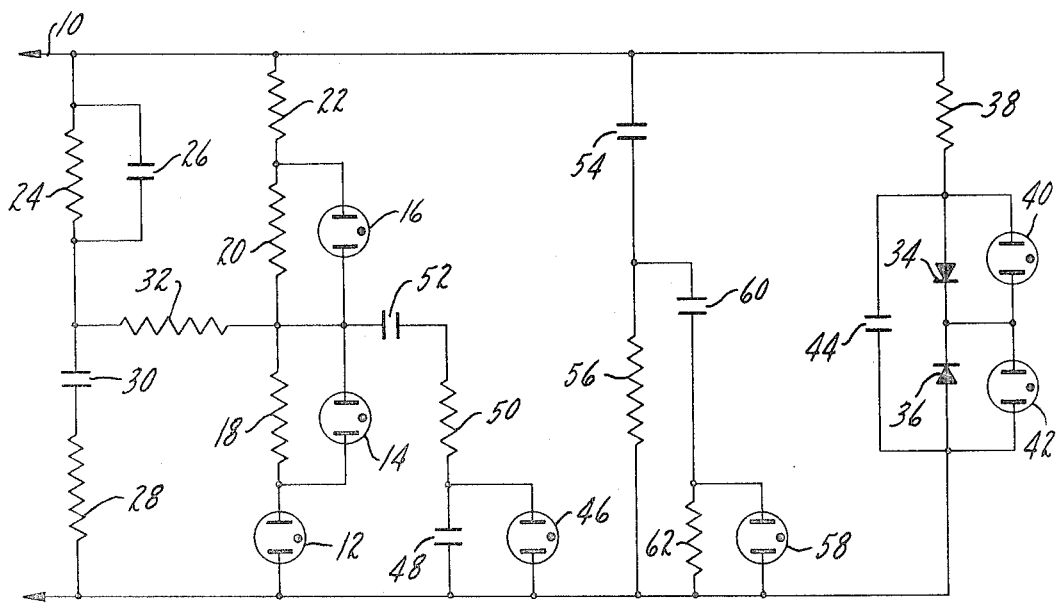
FIGURE 2 is a circuit diagram illustrating a modified form of voltage tester.

The circuit shown in FIGURE 1 provides a satisfactory frequency indicating arrangement for designating high frequencies, however, it is preferred to provide a second high high pass filter which filters the filtered output from resistor 56 to provide a sharper cutoff. FIGURE 2 is identical with FIGURE 1 except that a second condenser 60 is in series with a second resistor 62, with this series combination being in parallel with resistor 56. Indicating bulb 58 is now across resistor 62. The voltage developed across resistor 62 is dependent upon the size of capacitors 60 and 54. At all frequencies above 400 cycles or some other suitable high frequency, there will be sufficient voltage to fire tube 58. In order to provide even sharper cutoff, if desired, it is possible to add additional filters much the same as the filter composed of capacitor 60 and resistor 62. The number of filters used will be dictated by the sharpness of the desired cutoff as well as expense.

The use, operation and function of the invention are as follows:

The circuit shown includes means for testing voltage amplitude, polarity, and frequency. The voltage to be tested may be either A.C. or D.C. The circuit includes neon bulbs for indicating the various parameters of the voltage under test.

Of particular importance in the present circuit are the filters for operating the frequency designation bulbs. The low frequency indicator, which may indicate 60 cycles, includes a low pass filter in the sense that frequencies above 60 cycles do not provide a sufficient voltage drop across the capacitor in parallel with the low frequency indicator. In like manner, the high frequency indicator includes a high pass filter in that only frequencies above a predetermined lower limit will provide a sufficient voltage drop across a resistor in parallel with the high frequency indicator.

High and low pass filters provide excellent frequency recognition circuits. The sharpness of the cutoff on each filter is determined by the separation of the frequencies to be measured. The closer the frequencies the sharper the cutoff. High and low pass filters are substantially more satisfactory than a band pass filter to block out intermediate frequencies. Band pass filters have more components and the components must be of greater precision to provide sufficiently sharp cutoff.

The high pass filter may include a single filtering circuit, however, preferably there is more than one filter circuit in order to provide sharper cutoff. As shown in FIGURE 2, there is a second filter which in effect filters the output from the first high pass filter. If desired, additional filters may be added to further define the cutoff point.

The neon bulbs used for voltage amplitude measurement as well as for the other indications, fire at peak voltage. Accordingly it is necessary to provide a compensating network between the input and the voltage amplitude indicators so that the bulbs will fire at the same voltage, whether it be A.C. or D.C. The voltage compensating network shown reduces the A.C. voltage by the square root of 2 or brings it down to the R.M.S. value, so that the peak voltage to the neon bulbs, whether A.C. or D.C., will be the same.

The low frequency or 60-cycle filter network includes means for providing a regulated voltage to the low frequency indicating tube. If such an arrangement were not provided, the 60-cycle indicator would be fired at 400-cycle voltages above 300 volts or so. The low frequency filter network may have additional filter sections, if desired, to further define the cutoff point.

The firing points of the frequency indicating tubes may be varied. Resistor 24 is effective to vary the firing potential of tube 46 and resistor 28 is effective to vary the firing potential of tube 58.

The invention should not be limited to the precise arrangement of components shown, as what is important is to provide circuit arrangements to give all of the various parameters of the voltage under test.

Whereas the preferred form of the invention has been shown and described herein, it should be realized that there are many substitutions, modifications and alterations thereto within the scope of the following claims.

What is claimed is:

1. A voltage tester circuit including an input, a plurality of voltage indicators connected generally in series across said input and each arranged to be activated at a different input voltage, a compensating network connected between the input and at least one of said voltage indicators, which network provides generally the same voltage amplitude at said one indicator for both A.C. and D.C. voltage inputs, a low frequency indicator connected to said input, and a low frequency filter network for activating it, and a high frequency filter network including a first resistor and a first capacitor in series across said input, a second resistor and a second capacitor in series connection across said first resistor, and a high frequency indicating means in parallel with said second resistor.

2. The circuit of claim 1 further characterized in that said high frequency indicator means is responsive to 400-cycle inputs and all frequencies above.

3. The circuit of claim 1 further characterized in that said high frequency indicator means is a gas indicating tube in parallel with said resistor.

4. The circuit of claim 1 further characterized by and including a voltage polarity network across said input, said voltage polarity network including at least one indicator.

References Cited by the Examiner

UNITED STATES PATENTS

| | | | |
|---|---|---|---|
| 2,409,150 | 10/1946 | Rice | 324—78 |
| 2,556,586 | 6/1951 | Johnston | 324—78 |
| 2,956,229 | 10/1960 | Henel | 324—122 |
| 3,231,816 | 1/1966 | Oehlerking | 324—78 |

FOREIGN PATENTS 1,089,064  9/1960  Germany.

WALTER L. CARLSON, *Primary Examiner.*

RUDOLPH V. ROLINEC, *Examiner.*